United States Patent
Pabst et al.

(10) Patent No.: US 11,230,953 B2
(45) Date of Patent: Jan. 25, 2022

(54) ELECTRICALLY HEATABLE HEATING DISK FOR EXHAUST GAS AFTERTREATMENT

(71) Applicant: Vitesco Technologies GMBH, Hannover (DE)

(72) Inventors: Christoph Pabst, Melle (DE); Peter Hirth, Rösrath (DE); Ferdi Kurth, Mechernich (DE); Lukas Hort, Bergisch Gladbach (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/822,599

(22) Filed: Mar. 18, 2020

(65) Prior Publication Data

US 2021/0293170 A1 Sep. 23, 2021

(51) Int. Cl.
*F01N 3/28* (2006.01)
*F01N 3/20* (2006.01)

(52) U.S. Cl.
CPC ............ *F01N 3/2013* (2013.01); *F01N 3/28* (2013.01); *F01N 3/281* (2013.01); *F01N 2240/16* (2013.01); *F01N 2330/02* (2013.01); *F01N 2330/06* (2013.01); *F01N 2330/32* (2013.01); *F01N 2450/00* (2013.01)

(58) Field of Classification Search
CPC ...... F01N 3/281; F01N 3/2013; F01N 13/008; F01N 2240/16
See application file for complete search history.

(56) References Cited

U.S. PATENT DOCUMENTS

| 5,140,812 A | 8/1992 | Cornelison et al. |
| 5,546,746 A | 8/1996 | Whittenberger et al. |
| (Continued) | | |

FOREIGN PATENT DOCUMENTS

| CN | 1373830 A | 10/2002 |
| CN | 102414409 A | 4/2012 |
| (Continued) | | |

OTHER PUBLICATIONS

Machine translation of JP-11253814-A; accessed May 19, 2021. (Year: 2021).*

(Continued)

*Primary Examiner* — Jonathan R Matthias

(57) ABSTRACT

A heating disk for heating up a stream of exhaust gas and/or a component for exhaust gas aftertreatment has a honeycomb body, wound from a plurality of smooth and corrugated metal layers stacked on top of one another. The honeycomb body is received within a carrier shell and an electrical contact is fed through the carrier shell. The honeycomb body is connected to a current source via the electrical contact. The electrical contact has a contact strip within the carrier shell extending in the circumferential direction of the carrier shell. An insulating region is formed between the carrier shell and the contact strip. A plurality of stacks of layers are electrically insulated from one another. Each of the stacks of layers are formed from the plurality of smooth and corrugated metal layers, and which are arranged directly adjacent to one another and conductively connected to the contact strip.

13 Claims, 2 Drawing Sheets

(56) References Cited

U.S. PATENT DOCUMENTS

| | | | |
|---|---|---|---|
| 5,614,155 A * | 3/1997 | Abe | F01N 3/2875 422/174 |
| 5,670,746 A | 9/1997 | Hashimoto et al. | |
| 6,513,324 B2 | 2/2003 | Bruck et al. | |
| 8,997,470 B2 | 4/2015 | Yoshioka et al. | |
| 9,049,750 B2 | 6/2015 | Ishihara et al. | |
| 9,225,107 B2 | 12/2015 | Hirth et al. | |
| 9,623,373 B2 | 4/2017 | Brueck et al. | |
| 2010/0089036 A1 * | 4/2010 | Hodgson | B01D 53/9495 60/277 |
| 2012/0097659 A1 | 4/2012 | Duesterdiek et al. | |
| 2015/0030509 A1 | 1/2015 | Brueck et al. | |

FOREIGN PATENT DOCUMENTS

| | | |
|---|---|---|
| CN | 102803673 A | 11/2012 |
| CN | 104364483 A | 2/2015 |
| DE | 4306482 A1 | 9/1993 |
| DE | 4307431 A1 | 9/1994 |
| DE | 19943846 A1 | 3/2001 |
| EP | 0412103 A1 | 2/1991 |
| EP | 0490222 A1 | 6/1992 |
| EP | 0553942 A1 | 8/1993 |
| EP | 2175115 A1 | 4/2010 |
| JP | H0842338 A | 2/1996 |
| JP | H08103664 A | 4/1996 |
| JP | H08224443 A | 9/1996 |
| JP | 11253814 A * | 9/1999 |
| JP | H11253814 A | 9/1999 |
| JP | 2008186687 A | 8/2008 |
| JP | 2013198887 A | 10/2013 |
| JP | 2015056334 A * | 3/2015 |

OTHER PUBLICATIONS

Machine translation of JP-2015056334-A, accessed May 19, 2021. (Year: 2021).*

International Search Report and Written Opinion dated Nov. 7, 2018 from corresponding International Patent Application No. PCT/EP2018/075044.

Korean Office Action dated Jul. 1, 2021 for corresponding Korean Patent Application No. 10-2020-7011281.

Chinese Office Action dated Jun. 11, 2021 for corresponding Chinese Patent Application No. 201880053768.1.

Japanese Office Action dated May 11, 2021 for corresponding Japanese Patent Application No. 2020-511915.

* cited by examiner

ELECTRICALLY HEATABLE HEATING DISK FOR EXHAUST GAS AFTERTREATMENT

CROSS-REFERENCE TO RELATED APPLICATION

This application claims the benefit of PCT Application PCT/EP2018/075044, filed Sep. 17, 2018, which claims priority to German Application DE 10 2017 216 470.0, filed Sep. 28, 2017. The disclosures of the above applications are incorporated herein by reference.

TECHNICAL FIELD

The invention relates to a heating disk for heating up a stream of exhaust gas and/or a component for exhaust gas aftertreatment, and also relates to a method for producing the heating disk.

BACKGROUND

Heating disks used for additional heating up of components for exhaust gas aftertreatment are known in the prior art. The aim is to reach a temperature range favorable for the aftertreatment of the exhaust gas more quickly, in order to be able to comply with the legally prescribed values for exhaust gas aftertreatment.

For this purpose, heating disks, similar to the honeycomb bodies of the other exhaust gas aftertreatment components, are for example created from a stack of layers of smooth and corrugated metal layers, which are wound up in one process step in order to obtain a disk with an appropriate shape.

The heating takes place using the ohmic resistance by introducing a current into the heating disk. However, in known devices the current introduced is not uniformly distributed, which leads to inhomogeneous heating up of the heating disk. Previously known methods to avoid inhomogeneous heating are difficult to implement in terms of production technology or involve high technical outlay and high costs.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An electrical heating disk for heating a component for exhaust gas aftertreatment that has optimized current introduction to ensure homogeneous heating up of the heating disk is provided. A method which can be used for producing such a heating disk is also provided.

An exemplary embodiment relates to a heating disk for heating up a stream of exhaust gas and/or a component for exhaust gas aftertreatment. A honeycomb body is wound from a plurality of smooth and corrugated metal layers stacked on top of one another. The honeycomb body is received within a carrier shell. An electrical contact structure is fed through a feedthrough defined by the carrier shell and via which the honeycomb body can be connected to a current source. The electrical contact structure has a contact strip extending in a circumferential direction of the carrier shell in a region enclosed by the carrier shell. An insulating region is formed between the carrier shell and the contact strip. A plurality of stacks of layers electrically insulated from one another, are each formed from a plurality of smooth metal layers and corrugated metal layers, are arranged directly adjacent to one another, and are connected electrically conductively to the contact strip.

The plurality of stacks of layers can be uniformly supplied with an electrical current via a common contact strip. The contact strip may be formed as a metal strip, which can be connected to a current source by an electrical contact structure fed through the carrier shell.

The contact strip is thus part of the line section for the electrical current. The contact strip may therefore be electrically insulated with respect to the carrier shell, in order to prevent the current from flowing in the carrier shell itself.

The contact strip is in electrically conductive contact with a plurality of stacks of layers which are electrically insulated from one another. Thereby uniform current introduction into the plurality of stacks of layers can be achieved with only a single electrical feedthrough through the carrier shell. In one embodiment, there is an electrically conductive connection between the contact strip and all of the stacks of layers of the heating disk.

The stacks of layers may be electrically insulated from one another. The electrical insulation of the stacks of layers from one another prevents the current from searching for a preferred short conduction path through the stacks of layers on the basis of the principle of the least electrical resistance. As a result, this prevents local hot spots from being able to occur, and thus an uneven temperature distribution across the heating disk. In particular at high currents, if there is unwanted formation of hot spots, the heating disk may be damaged.

For the purpose of electrical insulation, an air gap may be provided between the individual stacks of layers. As an alternative to this, an insulating layer, for example of a ceramic material, may also be provided.

The carrier shell may have a radially outwardly directed bulge, which forms a receptacle for the contact strip extending in the circumferential direction.

The bulge may provide a receiving region in the region enclosed by the carrier shell for the insulating region between the contact strip and the carrier shell. Therefore, the contact strip does not have to be accommodated in the cross section formed by the rest of the carrier shell. As a result, the active heating surface that could be flowed around during operation would be reduced. Thus, filling the cross-sectional area of the carrier shell as completely as possible with the wound-up stacks of layers in order to form the largest possible number of channels through which flow is possible and to form as fewest possible offsets and sharp-edged transitions.

Filling a cross-sectional area with the stacks of layers if it has a continuous peripheral region and does not have to include additional elements, such as in particular the contact strip is easier from a production point of view.

A exemplary embodiment is characterized in that the insulating region is formed by an air gap, or in that the insulating region is formed by a ceramic insulation.

The insulating region may formed by a layer of ceramic material. This may be introduced directly into the bulge or applied to the contact strip. The contact strip, which may be formed from an electrically conductive metal, may be connected to the ceramic insulation. For this purpose, the use of an active solder, and/or the preceding metallization of the ceramic insulating layer, as a result of which the contact strip can for example also be soldered or welded on may be used.

In such a construction, the ceramic layer also acts at the same time as a mechanical support for the contact strip with respect to the carrier shell.

As an alternative, an air gap may be provided between the contact strip and the carrier shell. Means for stabilizing the contact strip in the carrier shell may be additionally provided. Also measures may be taken to prevent unintentional contacting of the carrier shell due to vibrations or other external interfering influences.

The contact strip may be connected electrically conductively to up to three stacks of layers, which are otherwise electrically insulated from one another. Therefore, current can be introduced more exactly and a more homogeneous current distribution is achieved over the entire surface area of the heating disk.

The higher the number of layers arranged in parallel in a stack, the more possibilities there are for the current flowing through the stack to spread along regions of reduced resistance, and thus to create regions which are flowed through above average and at the same time to create regions which are flowed through below average. This can result in an inhomogeneity in the temperature distribution, as a result of which the heating power or the overall performance of the heating disk is reduced. In addition, durability is adversely affected by the inhomogeneous temperature distribution and the resulting stresses in the material.

Therefore, the stack of layers may be divided into sub-stacks that are insulated from one another. The more layers the overall stack has, the more sub-stacks that are desirable. Practical tests have shown that sub-stacks with no more than 5 to 7 layers produce a uniform distribution. In the case of heating disks with a particularly large diameter, stacks of up to 20 overall layers are possible, each overall layer respectively consisting of one smooth layer and one corrugated layer. This results in a possible division of 2 to 3 sub-stacks. The division may be into one stack with 3 to 7 layers, into two stacks with 8 to 14 layers and into 3 stacks with more than 15 layers.

In addition, if the up to five, in particular three, stacks of layers each have up to seven corrugated metal layers and have up to eight smooth metal layers.

Furthermore, the contact strip extends in the circumferential direction of the carrier shell, and a partial region of the contact strip may be angled in relation to the central axis of the honeycomb body. This increases the distance between the contact strip and the carrier shell in such a way that even a movement of the contact strip due to shocks, thermal expansion or the like does not lead to an electrically conductive contact between the contact strip and the carrier shell.

The angled region of the contact strip may also be dimensioned such that the resonant frequency of the angled region with values above 2500 Hz is in a range outside the oscillation frequencies of the exhaust system.

The contact strip is intended to receive the entire current that can flow through the heating disk, and must therefore necessarily have a cross section which is equal to or greater than the sum obtained by multiplying the thicknesses by the widths of the foils forming the metal layers. The thickness, including an allowance to compensate for the reduced cooling surfaces, is based on:

$$\text{thickness}_{contact\ strip} = D_f \times (n_{corrugated\ layers} + 1) \times 300 \mu m$$

where the correction factor $D_f$ may be between 0.6 and 1.5.

The contact strip is thus dimensioned such that it can withstand vibrational loads of for example 2500 Hz without being destroyed.

A material with a low specific resistance, for example less than $1.5 \Omega \times mm^2/m$, may be used in order to generate as little heat as possible in this region.

In addition, the feedthrough for the electrical contact structure through the carrier shell may have a cross section that tapers conically from the outside inward for a secure hold, which may be produced by pressing the inner conductor into the feedthrough. With the increase in the pressing-in force, and thus the advancement of the inner conductor, the fixing of the inner conductor in the feedthrough can therefore be influenced.

Furthermore, it is expedient if the electrical contact structure is formed by an inner conductor, which is inserted in a receiving sleeve penetrating the carrier shell, wherein the inner conductor is spaced apart from the receiving sleeve by an electrically insulating layer. This ensures electrical contacting of the contact strip on the inside and at the same time avoid electrical contacting between the inner conductor and the carrier shell in which the receiving sleeve is held.

The inner conductor and/or the receiving sleeve may have a conically tapering cross section in order to allow a defined pressing-in of the inner conductor into the receiving sleeve. Depending on the dimensioning of the inner conductor and the receiving sleeve, an exactly defined insertion depth for the inner conductor can be ensured for a given pressing-in force.

In addition, the contact strip may be connected to the elements that form the electrical contact structure and are fed through the carrier shell and is positioned relative to the carrier shell by these elements. This creates a securement for the inner conductor, in order to avoid inadvertent loosening of the inner conductor and on the other hand makes reliable electrical contact with the contact strip in a simple manner and to fix it inside the carrier shell.

The contact strip may be connected to the carrier shell in a mechanically fixed but electrically insulating manner in relation to the insulating layer by means of a metal/ceramic soldered connection.

An exemplary embodiment relates to a method for producing a catalytic converter with a heating disk as described in the embodiments above. The steps of the method being: forming a bulge in the carrier shell; coating the bulge with a ceramic insulating layer; introducing the contact strip into the region enclosed by the carrier shell; soldering the stacks of layers to the contact strip, and soldering or welding the electrical contact structure to the contact strip.

Such a method creates a receiving region in the interior of the carrier shell for the contact strip and the electrically insulating layer, without having to fill the cross-sectional area predetermined by the carrier shell with elements other than the wound-up stacks of layers. The entire cross-sectional area formed by the carrier shell may be filled with the wound-up stacks of layers in order to obtain the largest possible area that can be flowed through, and thus optimize heat transfer from the heating disk to the stream of exhaust gas.

The insulating layer may be subjected to a metallization in order to achieve a connection of the contact strip to the insulating layer using conventional methods, such as welding or soldering.

The inner conductor and the receiving sleeve may be pressed together on the carrier shell in order to ensure that the inner conductor and the receiving sleeve are firmly connected to one another and that the elements do not unintentionally come apart.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The invention will be explained in detail in the following text on the basis of exemplary embodiments with reference to the drawings, in which.

DETAILED DESCRIPTION

Figure 1:
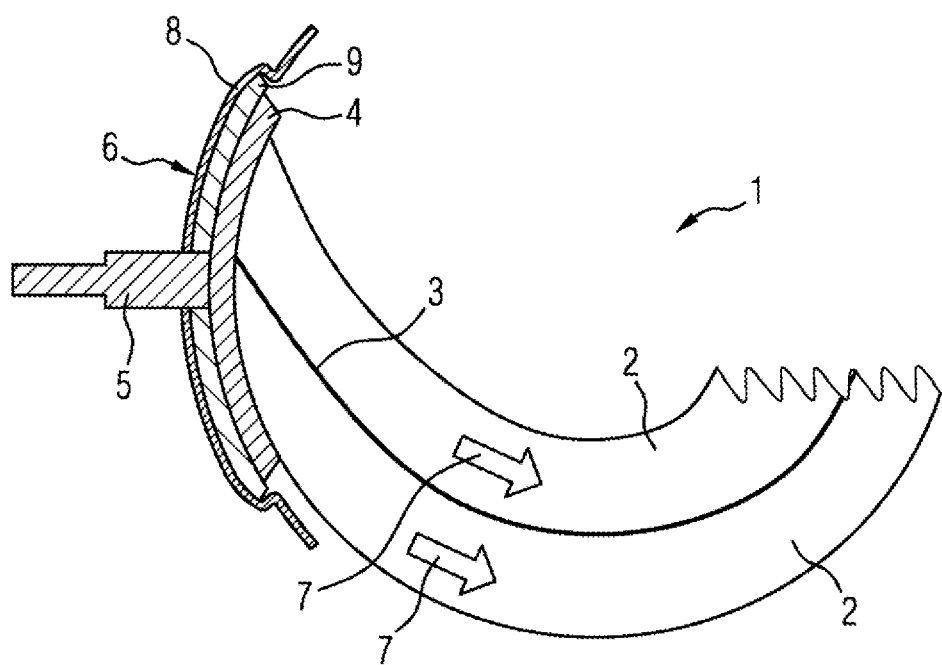
FIG. 1 shows a schematic sectional view through a heating disk according to the invention with a feedthrough for an electrical contact structure and a contact strip for connecting a number of stacks of layers.

FIG. 1 shows a sectional view through a heating disk 1. The heating disk 1 is formed from a plurality of stacks of layers 2, which in turn are formed from smooth metal layers and corrugated metal layers stacked one on top of the other. The stacks of layers 2 are electrically insulated from one another by an air gap 3, so that the current cannot flow from one stack of layers 2 to the next.

The stacks of layers 2 are connected at the end to a contact strip 4. The contact strip 4 is for its part connected to an electrical conductor, not shown in FIG. 1, which is fed through the feedthrough 5 into the heating disk 1.

The wound-up stacks of layers 2 and the contact strip 4 are arranged within a carrier shell 6, which encompasses the heating disk 1 formed by the stacks of layers 2 and gives it the necessary stability.

The electrical current is transmitted through the feedthrough 5 to the contact strip 4 and flows through the stacks of layers 2 along the arrows 7. In the exemplary embodiment in FIG. 1, two stacks of layers 2 are electrically conductively connected to the contact strip 4. The two stacks of layers 2 are therefore uniformly subjected to the current flowing through the feedthrough 5. The electrical insulation of the stacks of layers 2 from one another also ensures that in each case the current only flows along the respective stacks of layers 2 and does not flow uncontrollably into adjacent stacks of layers 2. This ensures that there are no shortened current flow paths that can lead to an inhomogeneous temperature distribution, and thus adversely affect the efficiency of the heating disk 1.

The carrier shell 6 has a radially outwardly directed bulge 8. This bulge 8 serves for receiving the contact strip 4 and possibly an insulating region 9. The bulge 8 is preferably such that the contact strip 4 can be completely received in it, and thus the entire cross-sectional area enclosed by the carrier shell 6 can be used for the wound-up stacks of layers 2 or the heating disk 1 formed from them.

Depending on the design, the insulating region 8 may be formed by a layer of air in which the contact strip 4 is arranged at a sufficient distance from the carrier shell 6, or by a ceramic material layer. The contact strip 4 is preferably supported with respect to the carrier shell 6, and possibly also connected to it, by the ceramic insulating layer. This increases the strength and durability of the heating disk.

The feedthrough 5 may be welded or soldered to the carrier shell 6 in order to ensure a permanent hold.

Figure 2:
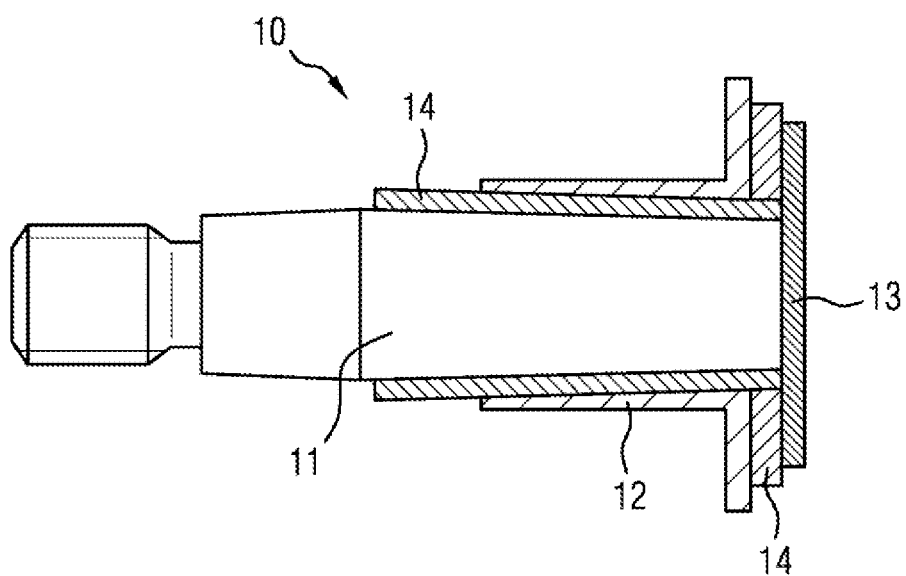
FIG. 2 shows a sectional view through a feedthrough with an inner conductor, which is used to introduce an electrical current into the stacks of layers.

FIG. 2 shows a sectional view through a feedthrough 10, as it has already been indicated in FIG. 1 by reference numeral 5.

The feedthrough 10 has an inner conductor 11, which leads through a receiving sleeve 12 connected to the carrier shell to the contact strip 13. Arranged between the receiving sleeve 12 and the inner conductor 11 is an insulating layer 14, which creates an electrical insulation with respect to the carrier shell.

The contact strip 13 and the inner conductor 11 may be welded or soldered to one another.

The exemplary embodiment in FIG. 2 shows an inner conductor 11 and a receiving sleeve 12, each of which has a cross section that tapers conically inward. By pushing the inner conductor 11 into the receiving sleeve 12, a pressing effect is thus produced between the inner conductor 11 and the receiving sleeve 12.

Such a design of the receiving sleeve 12 and the inner conductor 11 also ensures that the contact strip 13 is held securely in its position, since the inner conductor 11 cannot slip into the inner region of the carrier shell due to the conical design.

Figure 3:
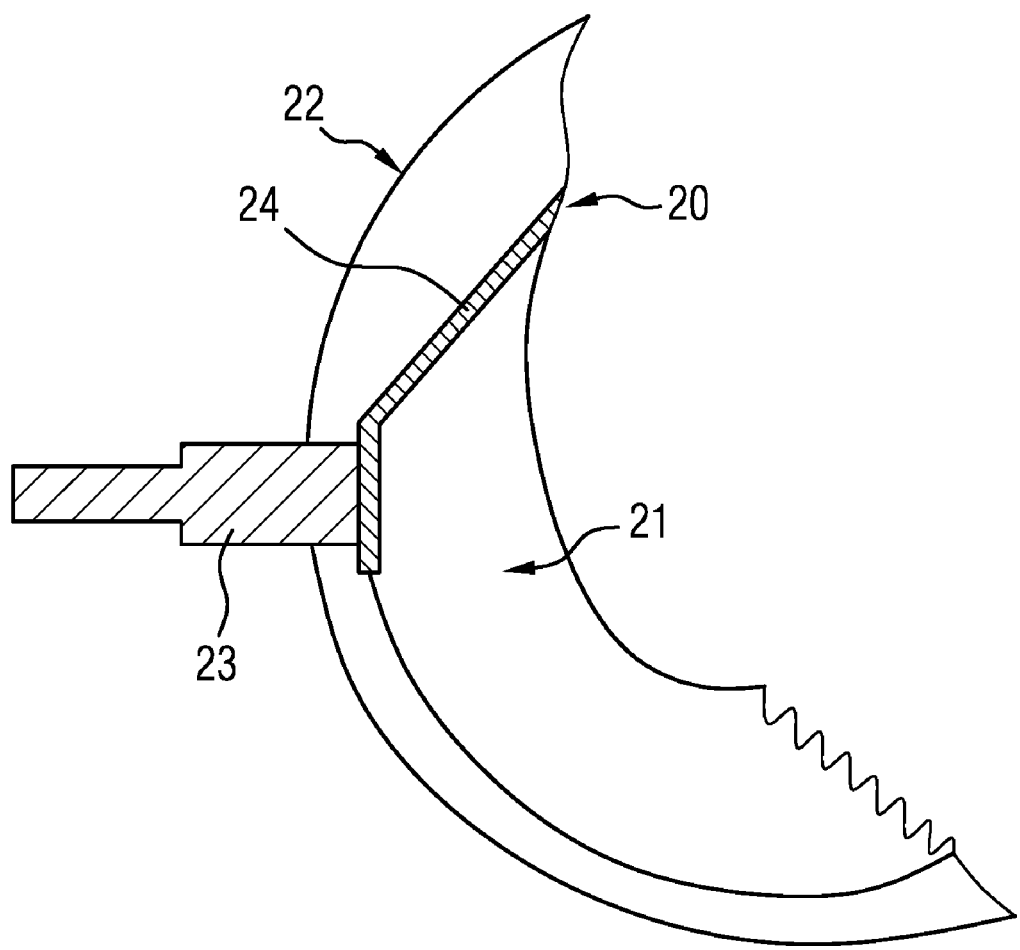
FIG. 3 shows a further schematic sectional view through a heating disk, wherein the contact strip has an angled region.

FIG. 3 shows an alternative design of the contact strip 20 in a construction that otherwise corresponds to that of FIG. 1. In FIG. 3, for the sake of simplicity the contact strip 20 is only connected to one stack of layers 21. However, the connection of a number of stacks of layers that are electrically insulated from one another is possible.

The contact strip 20 has an angled region 24, which is bent radially inward away from the carrier shell 22. Thus, the distance between the carrier shell 22 and the contact strip 20 is increased, as a result of which an improved electrical insulation may be achieved, even if no electrically insulating layer, such as for example a ceramic layer, is provided.

The contact strip 20, and in particular the angled region 24, may be designed with regard to the material selection and the dimensioning in particular in such a way that the natural frequency of the contact strip 20 lies outside the frequency spectrum of the vibrations in an exhaust system of a motor vehicle in order to avoid resonance phenomena.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A heating disk for heating up a stream of exhaust gas comprising:
   a carrier shell;
   a plurality of smooth and corrugated metal layers stacked on top of one another to form a plurality of stacks of layers;

a honeycomb body wound from the plurality of smooth and corrugated metal layers and located within the carrier shell;

an electrical contact structure extending through a feedthrough defined by the carrier shell and via which the honeycomb body can be connected to a current source;

a contact strip of the electrical contract structure located in a region enclosed by the carrier shell and extending in the circumferential direction of the carrier shell;

an insulating region formed between the carrier shell and the contact strip;

a radially outwardly extending bulge formed as part of the carrier shell, the contact strip and the insulating region received into the radially outwardly extending bulge;

wherein each of the plurality of stacks of layers are electrically insulated from one another, arranged directly adjacent to one another, and connected electrically conductively to the contact strip, wherein each are formed from the plurality of smooth metal layers and corrugated metal layers.

2. The heating disk as claimed in claim 1, wherein the insulating region is formed by one of: an air gap and ceramic insulation.

3. The heating disk as claimed in claim 1, wherein the contact strip is electrically conductively connected to up to three of the plurality of stacks of layers, which are otherwise electrically insulated from one another.

4. The heating disk as claimed in claim 1, wherein up to five of the plurality of stacks of layers each have up to seven corrugated metal layers and up to eight smooth metal layers.

5. The heating disk as claimed in claim 4, wherein there are three stacks of layers.

6. The heating disk as claimed in claim 1, wherein the contact strip extends in the circumferential direction of the carrier shell, and a partial region of the contact strip is angled in relation to the central axis of the honeycomb body.

7. The heating disk as claimed in claim 6, wherein the resonant frequency of the angled region is in a range outside the oscillation frequencies of the exhaust system.

8. The heating disk as claimed in claim 7, wherein the that the resonant frequency of the angled region is above 2500 Hz.

9. The heating disk as claimed in claim 1, wherein the feedthrough has a cross section that tapers conically from the outside inward.

10. The heating disk as claimed in claim 1, wherein the electrical contact structure is formed by an inner conductor inserted in a receiving sleeve penetrating the carrier shell, wherein the inner conductor is spaced apart from the receiving sleeve by an electrically insulating layer.

11. The heating disk as claimed in claim 10, wherein at least one of: the inner conductor and the receiving sleeve have a conically tapering cross section.

12. The heating disk as claimed in claim 10, wherein the contact strip is connected to the inner conductor, receiving sleeve, and insulating layer that form the electrical contact structure and are fed through the carrier shell and the contact strip is positioned relative to the carrier shell by the inner conductor, receiving sleeve, and insulating layer.

13. The heating disk as claimed in claim 1, wherein the contact strip has a mechanically fixed but electrically insulating connection to the carrier shell with at least one of metal or ceramic soldered connection.

* * * * *

UNITED STATES PATENT AND TRADEMARK OFFICE
CERTIFICATE OF CORRECTION

PATENT NO. : 11,230,953 B2  
APPLICATION NO. : 16/822599  
DATED : January 25, 2022  
INVENTOR(S) : Pabst et al.

Page 1 of 1

It is certified that error appears in the above-identified patent and that said Letters Patent is hereby corrected as shown below:

On the Title Page

Below item (65), please add:

Item (63) Related U.S. Application Data  
Continuation of application PCT Application PCT/EP2018/075044, filed on September 17, 2018.

Item (30) Foreign Application Priority Data  
September 18, 2017 (DE) ................10 2017 216 470

Signed and Sealed this  
Twenty-fifth Day of November, 2025

John A. Squires  
*Director of the United States Patent and Trademark Office*